United States Patent
Drew et al.

(10) Patent No.: US 7,428,300 B1
(45) Date of Patent: Sep. 23, 2008

(54) DIAGNOSING FAULT PATTERNS IN TELECOMMUNICATION NETWORKS

(75) Inventors: James Howard Drew, Boxborough, MA (US); Hui Liu, West Roxbury, MA (US)

(73) Assignee: Verizon Laboratories Inc., Waltham, MA (US)

( * ) Notice: Subject to any disclaimer, the term of this patent is extended or adjusted under 35 U.S.C. 154(b) by 696 days.

(21) Appl. No.: 10/316,157

(22) Filed: Dec. 9, 2002

(51) Int. Cl.
*H04M 1/24* (2006.01)
*H04M 3/08* (2006.01)
*H04M 3/22* (2006.01)

(52) U.S. Cl. .................... 379/29.09; 379/9; 379/9.02; 379/14.01; 379/15.05

(58) Field of Classification Search ............... 379/1.01, 379/9, 9.01, 27.01, 28, 29.08, 29.09, 32.01, 379/9.02, 9.04, 14.01, 15.01, 15.05, 133, 379/134; 714/25, 26, 47, 48
See application file for complete search history.

(56) References Cited

U.S. PATENT DOCUMENTS

| | | | |
|---|---|---|---|
| 5,483,468 A | 1/1996 | Chen et al. ............ 364/551.01 |
| 5,509,055 A | 4/1996 | Ehrlich et al. ............... 379/133 |
| 5,615,323 A | 3/1997 | Engel et al. .................. 395/140 |
| 5,805,819 A | 9/1998 | Chin et al. ............ 395/200.54 |
| 5,819,028 A | 10/1998 | Manghirmalani et al. 395/185.1 |
| 5,946,373 A * | 8/1999 | Harris ...................... 379/14.01 |
| 6,067,509 A | 5/2000 | Gaiski ......................... 702/170 |
| 6,112,015 A | 8/2000 | Planas et al. ............ 395/200.53 |
| 6,115,393 A | 9/2000 | Engel et al. .................. 370/469 |
| 6,321,338 B1 | 11/2001 | Porras et al. ................. 713/201 |
| 6,327,677 B1 | 12/2001 | Garg et al. .................... 714/37 |
| 6,393,386 B1 | 5/2002 | Zager et al. ................... 703/25 |
| 6,401,119 B1 | 6/2002 | Fuss et al. .................... 709/224 |
| 6,418,445 B1 | 7/2002 | Moerbeek .................... 707/103 |
| 2004/0071090 A1 * | 4/2004 | Corson et al. ............... 370/244 |
| 2004/0073844 A1 * | 4/2004 | Unkle et al. .................. 714/39 |

OTHER PUBLICATIONS

Ishikawa, "Guide to Quality Control", GTE Laboratories Incorporated, pp. 42-49, 50-51, 62-71.
Juran et al., "Juran's Quality Control Handbook", McGraw Hill, Inc., Fourth Edition, pp. 24.2-24.31.

* cited by examiner

*Primary Examiner*—Quoc D Tran (57) ABSTRACT

The disclosed methods and systems prioritize network devices and components that more likely result in a network outage by evaluating their current and historical outage information relative to a dynamically-generated, statistical threshold based on such outage information. The prioritized list of network devices can be organized by, for example, quantity of outages, number of outage minutes, and/or number of customer-outage minutes so as to provide diagnosis sequences by type of network device, network location, type of component within the network device, and/or by operation during particular time periods/events.

28 Claims, 9 Drawing Sheets

DIAGNOSING FAULT PATTERNS IN TELECOMMUNICATION NETWORKS

TECHNICAL FIELD

The disclosed methods and systems relate generally to telecommunications networks and more particularly to the diagnosis of fault patterns in such networks.

BACKGROUND

Telecommunication networks provide the connectivity required for computers and other data processing devices to communicate with each other over potentially expansive distances. As the number of participants in these networks increases and the performance and reliable operation of such networks become critical to the needs of its participants, it is expected that the complexity of these networks will also increase. For example, high-availability networks enabling users to access business/time-critical data and resources typically include redundant circuits and components (e.g., routers, switches, bridges, hubs, multiplexers, transport cables, etc.), so that a rapid failover can be effectuated before adversely affecting user operations.

Network administrators typically rely on network management software to monitor telecommunication networks, to provide sufficient information to reconfigure network and computer resources in view of changing user demands, and to troubleshoot network degradations, failures, and other trouble areas, so that the overall network availability remains commercially viable. Unfortunately, operation of the network management software typically requires a highly skilled network administrator who may have to query and sift through a large amount of information generated by numerous network devices of the telecommunications network to distinguish, for example, between random and non-random outages that may be indicative of various types of fault patterns. Fault patterns can include, for example, acute fault patterns, where network devices and their components and interconnections experience a relatively large number of outages during a particular time period, and chronic fault patterns, where sporadic outages occur irregularly. Accordingly, a continuing need exists to improve upon the usability of network management software and to, thus, ultimately improve upon network availability.

SUMMARY

The disclosed methods and systems improve the availability of telecommunication networks by enabling network troubleshooters to prioritize and focus their efforts on clusters of problem-prone network devices and components, thereby improving the likelihood that a problematic device/component will be rapidly identified, repaired/replaced, and returned to service. In one embodiment, the disclosed methods and systems prioritize the network devices and components that are responsible for non-random network outages by automatically evaluating their current and prior outage information relative to a dynamically-generated, statistical threshold based on such outage information. The prioritized list of network devices can be organized by, for example, quantity of outages, number of outage minutes, and/or number of customer-outage minutes, to provide diagnosis sequences by type of network device, particular network locations, type of component within the network device, and/or by operation during particular time periods/events. In this manner, a network administrator of the telecommunications network can predict or rapidly respond to outages in problem-prone network devices that most significantly impact network availability/performance, fail with greater frequency, and/or otherwise deteriorate or impede network performance.

The disclosed methods and systems identify a source of fault patterns in a telecommunications network (such as a digital subscriber line network). In one embodiment, the disclosed methods and systems comprise a data-acquisition process, a statistics process, and a priority process. The data-acquisition process accesses historical and current fault data associated with the operations of network devices on the telecommunications network and applies at least one filter criterion (e.g., a type of network device, locations within the network, etc.) to such data in order to identify a particular subset of fault data for further processing. The historical fault data can correspond to fault data generated during a prior time interval in which, for example, acutely and/or chronically recurring fault patterns occurred. This prior time interval can, for example, exceed one month and can be about three months. The current fault data can correspond to fault data generated on or about a network outage. Similarly, the data-acquisition process can also access and filter a list of components associated with the network devices to identify a subset of fault data for further processing.

The statistics process dynamically generates statistical metrics from at least a subset of fault data identified by the data-acquisition process. These statistical metrics include at least one threshold level that is used by the priority process to prioritize the subset of fault data and to identify an ordered list of at least some of the network devices or components of such devices whose operations exceed the threshold level. The ordered list of network devices can be based on at least one of the following: quantity of outages, number of outage minutes, and/or number of customer-outage minutes. The ordered list can be used to identify a diagnosis sequence for a type of network device and/or for network locations, based on the filter criterion used by the data-acquisition process. Similarly, when applied to the fault data of components within network devices, the priority process determines the operational effects of such components, which contribute to the formation of the subset of fault data, and prioritizes such operational effects into an ordered list based on at least the quantity of outages, number of outage minutes, and/or number of customer-outage minutes, thus resulting in a diagnosis sequence for such components.

BRIEF DESCRIPTION OF THE DRAWINGS

The foregoing discussion will be understood more readily from the following detailed description of the disclosed methods and systems, when taken in conjunction with the accompanying drawings in which.

DETAILED DESCRIPTION

Figure 1:
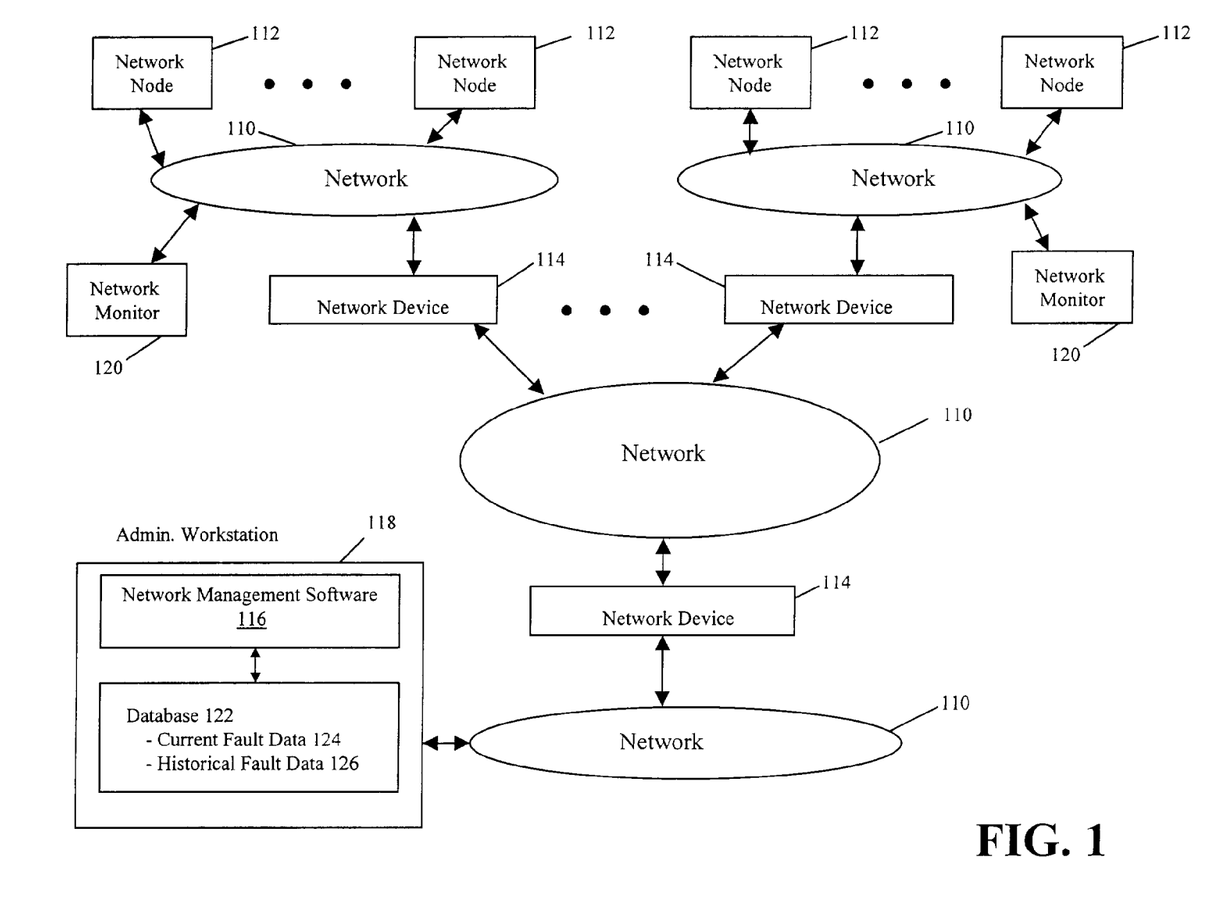
FIG. 1 is a block diagram of an exemplary multi-network system, which includes network management software that can provide diagnosis and other administrative support.

With reference to FIG. 1, telecommunications networks 110 comprise a series of network nodes 112 that can be interconnected by network devices 114 and communication lines (not shown) (e.g., public carrier lines, private lines, satellite lines, etc.) that enable the network nodes 112 to communicate. Network nodes 112 can be digital data processing devices, such as personal computers, servers, mainframe computers, handheld devices, or other types of data processing devices capable of receiving and processing data. The transfer of data (e.g., packets) between network nodes 112 can be facilitated by network devices 114, such as routers, switches, multiplexers, bridges, gateways, etc., that can manipulate and/or route data from a source node to a destination node regardless of dissimilarities in the network topology (e.g., bus, star, token ring), spatial distance (local, metropolitan, or wide area network), transmission technology (e.g., TCP/IP, Systems Network Architecture), data type (e.g., data, voice, video, or multimedia), nature of connection (e.g., switched, non-switched, dial-up, dedicated, or virtual), and/or physical link (e.g., optical fiber, coaxial cable, twisted pair, wireless, etc.) between the source and destination network nodes. Those of ordinary skill in the art will recognize that the particular arrangement of network nodes 112, network devices 114 and telecommunication networks 110 illustrated in FIG. 1 is merely exemplary and that the disclosed methods and systems can be employed with alternative arrangements.

As the complexity of telecommunications networks 110 increases, administrators of such networks 110 are challenged to maintain the network's availability (the average proportion of time a network is operating for a typical individual user) at sufficiently high levels to satisfy the needs of subscribing users. Although expansion of the networks 110 to include redundant network devices and communication lines can mitigate some of the risk of network outages and thus assist in maintaining desired availability levels, such redundancy increases the overall complexity of the networks 110 and further complicates network troubleshooting efforts, particularly when new or upgraded hardware and software are introduced into the networks 110.

In order to troubleshoot/fault isolate such complex networks 110, network administrators and technicians rely on network management software 116 hosted on one or more processor-controlled devices, including administrative workstations 118 that can collect, monitor, control and/or display various aspects of the network 110 and its constituent devices. The network management software 116 can perform these tasks by directly or indirectly accessing performance and other data from individual network devices 114, network monitors/probes 120, and one or more databases 122 (e.g., Microsoft Access database) associated with the network 110, and processes such data into information that can be displayed at one or more administrative workstations 118. Although the database 122 is shown as residing internally to the administrative workstation 118, those skilled in the art will recognize that the database 122 can be additionally and/or optionally reside at a location to which the network management software 116 can communicate.

Figure 2:
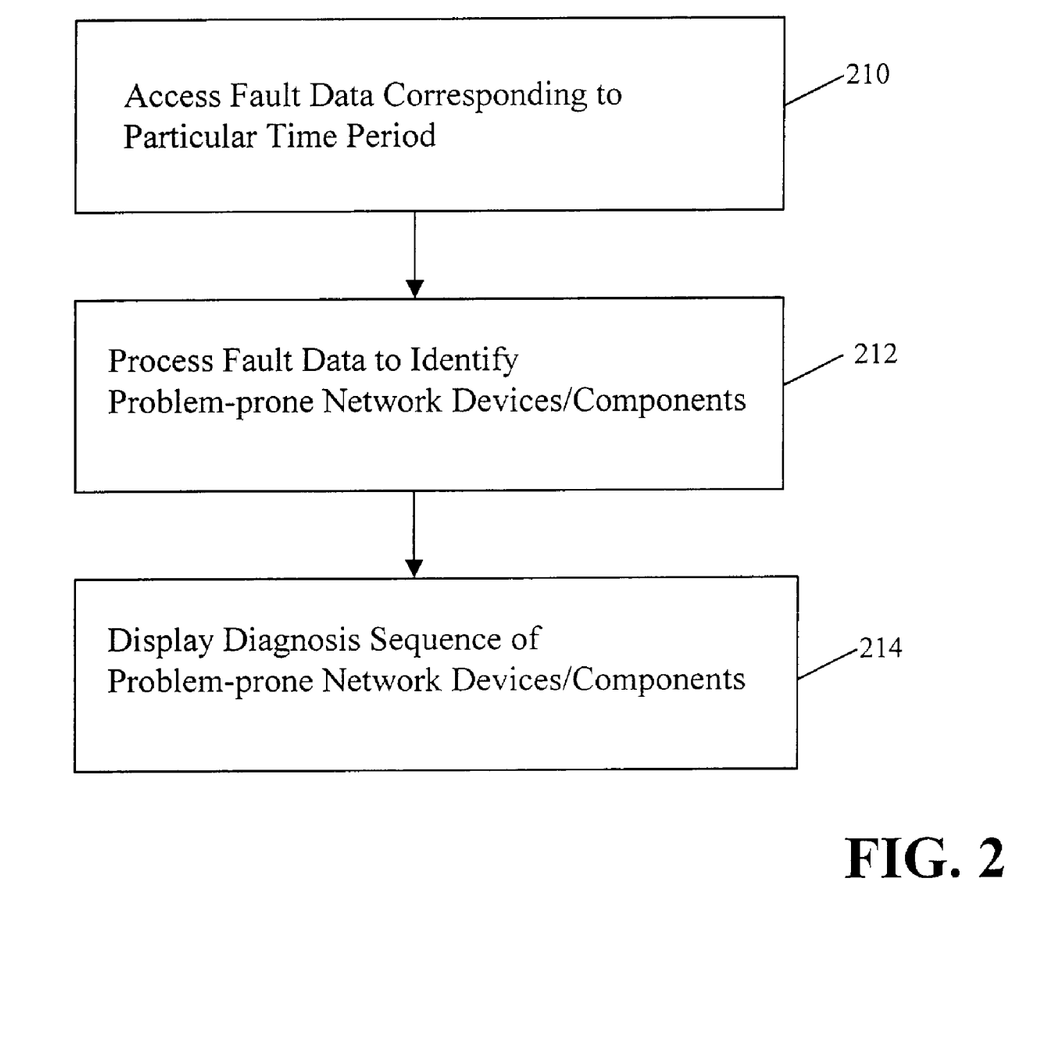
FIG. 2 provides a flow diagram of actions that can be performed by the network management software of FIG. 1.

With reference now also to FIG. 2, the disclosed methods and systems recognize that the processing of "raw" network data can include the identification of clusters of network devices 114 that are prone to certain types of problems and can assist the network administrator in devising a diagnosis sequence that improves the likelihood of isolating, for example, a non-random and/or recurring network fault to a network device. The network management software 116 can access current fault data 124 and historical fault data 126 stored within the database 122 (210); process the fault data 124, 126 to identify problem-prone network devices or components (212); and display a diagnosis sequence for such problem-prone devices to the network administrator and/or other network troubleshooters (214). Current fault data 124 refers to the fault data generated by one or more network devices and/or device components at about the time a network problem (e.g., outage) occurs. Historical fault data 126 refers to the fault data generated by one or more network devices and/or device components during a time interval that precedes a present network problem. In one embodiment, the fault data 124, 126 can include outage information, such as the date and time of a reported network problem, a type of equipment causing the problem, an identifier of the troublesome network device, a location of the troublesome network device, a number of each type of device at a location, a number of network users/subscribers affected, a description of the type of network problem and its resolution, and/or indicia of a component within a network device that caused the network problem.

Figure 3:
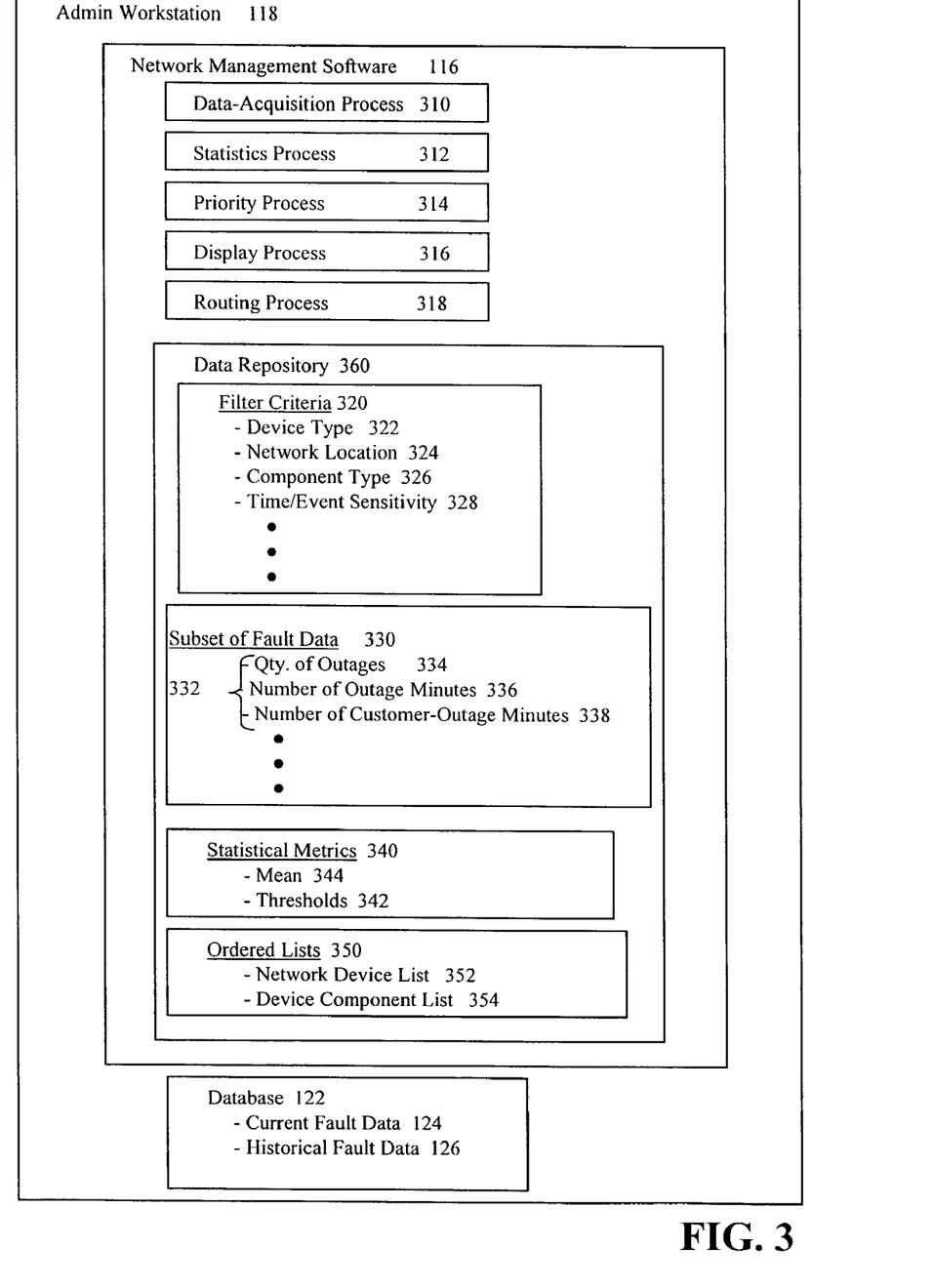
FIG. 3 is a schematic of the processes that provide the functionality of the network management software of FIG. 1, together with exemplary fault data, statistical metrics, filter criteria, and ordered lists that can be used or formed by such processes.

With reference to FIG. 3, the network management software 116 can include a number of software processes operating within an execution environment of the administrative workstation 118. In one embodiment, these software processes include a data-acquisition process 310, a statistics process 312, a priority process 314, a display process 316, and/or a routing process 318. These processes 310-318 can process the current and historical fault data 124, 126 in the database 122, one or more filter criteria 320, a subset of fault data 330, statistical metrics 340 and/or ordered lists 350 in a data repository 360 to determine appropriate diagnostic sequences for troubleshooting a network problem or series of network problems.

Figure 4:
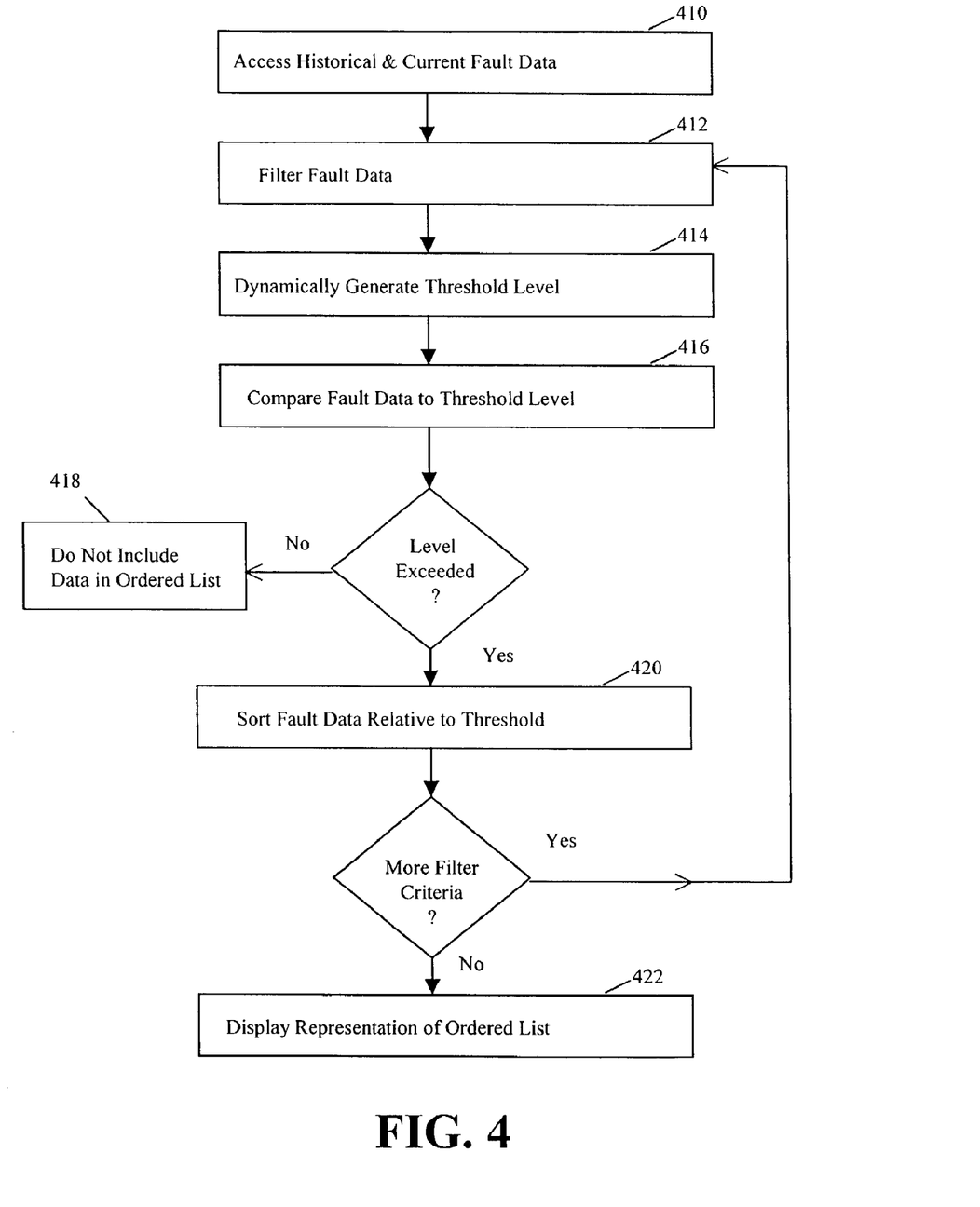
FIG. 4 provides a flow diagram of actions that can be performed by the processes of FIG. 3.

With reference now also to FIG. 4, the data-acquisition process 310 can access current and historical fault data 124, 126 associated with the operations of at least some of the network devices 114 (including fault data associated with the components of such devices) during a prior time interval that can be, for example, user-specified, dynamically-generated, variable, and/or fixed (410). In one embodiment, the time interval can be selected so that the fault data 124, 126 corresponds to repetitive fault patterns. The time interval can also be selected to reflect infrequently-occurring fault patterns. In one illustrative embodiment relating to digital subscriber line networks, the time interval can be about three months. The data-acquisition process 310 can filter the fault data generated during the time interval by, for example, device type 322, network location 324, component type 326, and/or time/event sensitivity 328 to reduce the larger set of fault data 124, 126 into a subset of fault data 330 that is more relevant to the diagnosis of the network problem (412). In one embodiment, the subset of fault data 330 includes the operational effects 332 that the operation of the network devices 114 and their constituent components had on the network 110 during the prior time interval. The operational effects 332 include, for example, a quantity of outages 334, a number of outage minutes 336, and/or a number of customer-outage minutes 338.

The statistics process 312 can statistically process the subset of fault data 330 generated by the data-acquisition process 310, and hence, dynamically generate one or more threshold levels 342 and/or other statistical metrics 340 such as a mean 344 of the subset data 330 (414). A threshold level 342 can be a "control limit" that can separate or distinguish random from non-random events.

In one embodiment, network outages reflected in the subset of fault data 330 can be understood to occur stochastically and thus the number of discrete outages "x" of a given type (e.g., for a network device) can be modeled by a Poisson process, such that the distribution of "x" is given by $f(x)=(\lambda^x/x!)e^{-\lambda}$. Accordingly, the Poisson parameter $\lambda$ can be based on one or more of the following network outage indicia: date of the outage, network device 114, network component, and location that relates to a non-random cause of a network outage. The statistics process 312 can detect Poisson parameter differences across these outage indicia, identify combinations of Poisson parameters that differ from mean parameter values, and identify thresholds 342 to distinguish network outages. This statistical process and/or analysis can also be extended to a continuous network outage measure, "y" (e.g., outage time), based on the network outage indicia described above, thereby resulting in the following normalized Gaussian distribution function with mean and variance, $\mu$ and $\sigma^2$: $f(y)=(1/\sqrt{2\pi\sigma})e^{-((y-\mu)^{}2)/2\sigma^{}2}$. These statistical understandings can also be the basis for one or more thresholds 342 relating to outage times and customer-outage minutes.

In one illustrative embodiment, and by way of non-limiting example, a threshold 342 for a quantity of outages 334 occurring weekly during a three month time interval (e.g., prior time interval) in a network 110, can be based on a Poisson process with common parameter $\lambda_k$, which is estimated by a period mean that can be represented as $\lambda'=(\Sigma_{i=1}x_1)/k$, where "$x_1$" are the number of outages per period and k is the number of periods. Using the Central Limit Theorem, the half-width of the asymptotic 95% confidence interval for a single Poisson-distributed observation with mean $\lambda$ and standard deviation $\sqrt{\lambda}$ is 1.96, resulting in a common parameter Poisson distribution of $P[x_i-\lambda>1.96\sqrt{\lambda'}]<0.025$, or substituting $\lambda'$ for $\lambda$, $\lambda'+1.96\sqrt{\lambda'}$ is a threshold for each of the outages $\{x_i\}$.

Similarly, thresholds 342 for outage minutes or customer-outage minutes can be computed for a weekly period, where the observations are mean minutes, based on the number of observations. The standard deviation of the "ith" of these observations is $\sigma'/\sqrt{x_i}$, where $$\sigma' = \left(\sum_{i=1}^{k}\sum_{j}(y_{ij}-y_{avg})^{**}2\right)/\sum_{i=1}^{k}x_i - 1$$

and $$y_{avg} = \left(\sum_{i=1}^{k}\sum_{j}y_{ij}\right)/\sum_{i=1}^{k}x_i,$$

yielding a threshold of $y_{avg}+1.96\sigma'/\sqrt{x_i}$. Note that the 95% Z-score of 1.96 can be changed to increase the sensitivity to network devices or components that are deteriorating. Although the methods of the statistics process 312 have been described with respect to particular presumptions and algorithms, one skilled in the art will recognize that the statistics process 312 can employ a variety of other mathematical methods to generate counterpart thresholds.

With continuing reference to FIGS. 3 and 4, the priority process 314 can compare data elements in a subset of fault data 330 filtered by the data-acquisition process 310 to one or more of the thresholds 342 computed by the statistics process 312 (416). Data elements not satisfying a threshold 342 may not be processed further (418), whereas data elements satisfying the threshold 342 can be sorted relative to the threshold 342 by the priority process 314 into one or more ordered lists 350 (420). The processes shown by 410-420 can be repeated for one or more of the filter criteria 320 to generate ordered lists of network devices, network locations, and/or component types within such network devices that are prioritized by, for example, quantity of outages 334, number of outage minutes 336, and/or number of customer-outage minutes.

The ordered lists 350 can include a network device list 352 for the operational effects 332 in the subset of fault data 330, which identify a prioritized sequence (i.e., a diagnosis sequence) of network devices that can be a source of the network problem (e.g., outage). Similarly, the ordered lists 350 can include one or more device component lists 352 for the network devices in the network device list 352. The device component list 354 can identify a prioritized sequence (i.e., diagnosis sequence) of components within targeted network devices, such as within the network devices in the network device list 352. Although the diagnostic sequences of network devices and device components have been described as ordered lists, these diagnostic sequences can be represented in a variety of other manners (e.g., textual, graphical, numerical, color-coded and/or a combination thereof), as will become apparent to one skilled in the art. In one embodiment, the display process 316 can format the ordered lists into control charts that can be viewed, for example, within a display (e.g., graphical user interface) of one or more administrative workstations 118 or other network-enabled devices by the administrator and/or other troubleshooters of the network 110 (422).

Figure 5A:
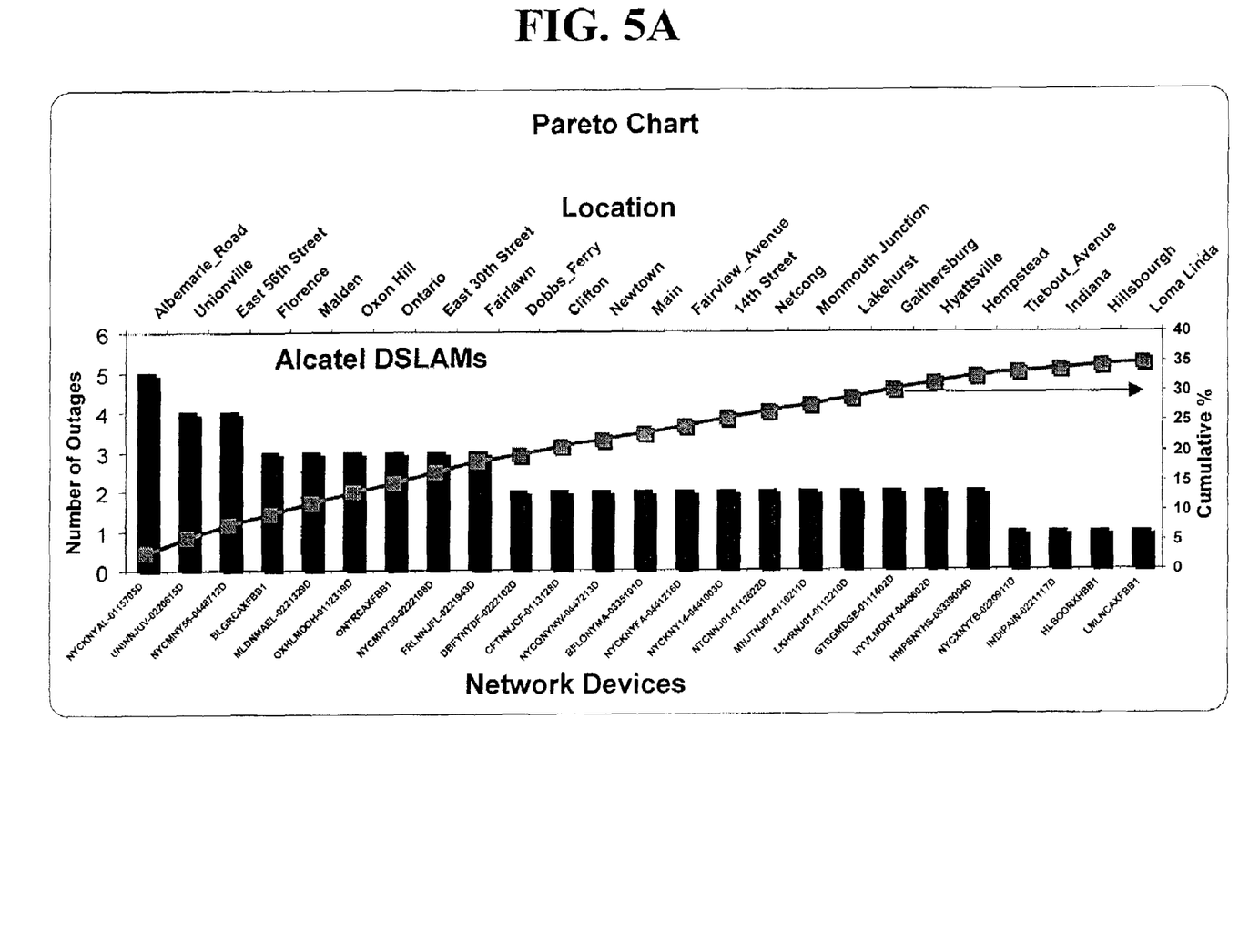
FIG. 5A is an exemplary control and Pareto chart, produced by one or more of the processes of FIG. 3, which identifies a diagnosis sequence for network devices of particular types by number of outages and cumulative percentages of such outages that exceed a dynamically-generated threshold.

In one embodiment, the diagnostic sequences can be represented in a plurality of control and Pareto charts, which reflect, for example, the number of outages, total outage minutes, or total customer-outage minutes for particular network devices, locations, or components, thereby assisting the network administrator in troubleshooting a variety of network problems. For example and with reference to a control and Pareto chart according to FIG. 5A, the network administrator can view a diagnosis sequence of particular devices, e.g., Alcatel DSLAMs, that exhibit outage numbers exceeding the threshold 342 so as to detect a pattern of closely-spaced outages or other recurrent outages experienced by such devices, which may be indicative of ineffective repair cycles and/or defective parts. The disclosed methods and systems thus enable the network administrator to detect fault patterns, identify potential root causes, and to focus troubleshooting efforts in accordance with the prioritized sequence of devices, thereby increasing the likelihood of a rapid and effective repair.

Figure 5B:
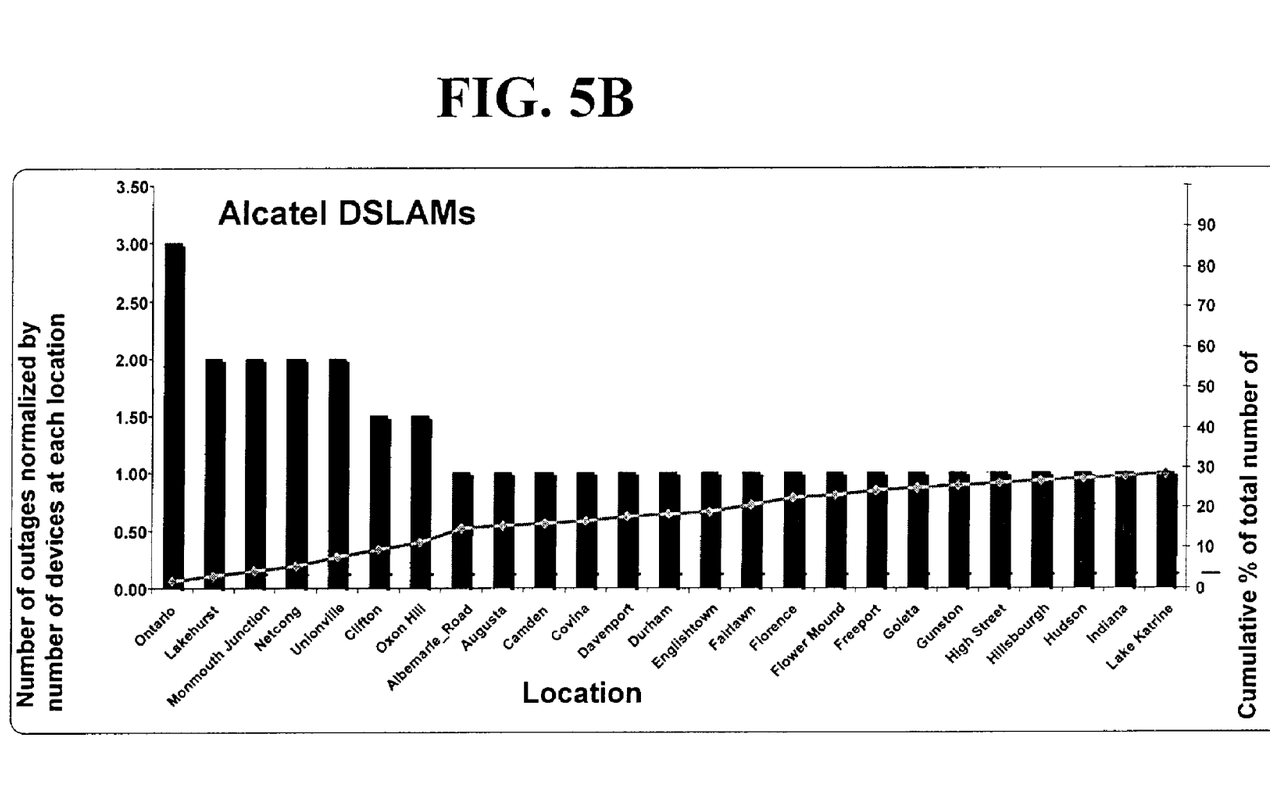
FIG. 5B is an exemplary control and Pareto chart, produced by one or more of the processes of FIG. 3, which identifies a diagnosis sequence of locations for network devices of particular types, by number of normalized outages and cumulative percentages of such outages that exceed a dynamically-generated threshold for particular network locations.

With reference to FIG. 5B, the network administrator can also compare outages of particular device types by location, where a location can have differing quantities of such devices. In one embodiment, the outage data can be normalized by dividing the outage number by the number of selected devices known to be at a location. Similar charts can be generated based on outage minutes and customer-outage minutes. In this manner, the network administrator can detect fault patterns that are, for example, concentrated at particular locations, result in long-duration outages, or that recur frequently at particular locations. These types of fault patterns can suggest location-related causes of the network problem, such as, problems relating to recently-installed network devices that have not been properly integrated into a particular location's network infrastructure, inadequate technician training, etc.

Figure 5C:
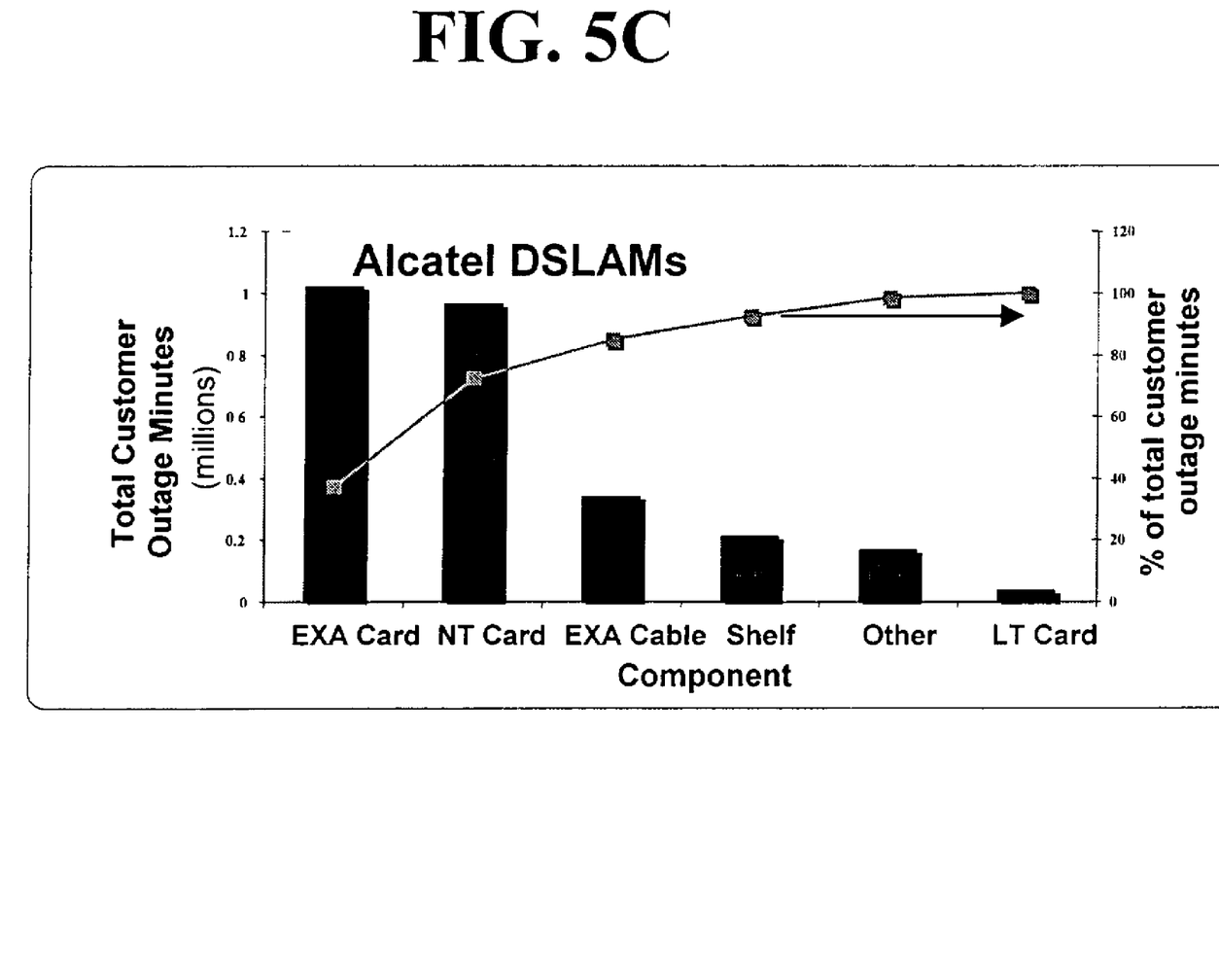
FIG. 5C is an exemplary control and Pareto chart, produced by one or more of the processes of FIG. 3, which identifies a diagnosis sequence for components within network device types, by number of customer-outage minutes and cumulative percentages of such outage minutes that exceed a dynamically-generated threshold.
Figure 5D:
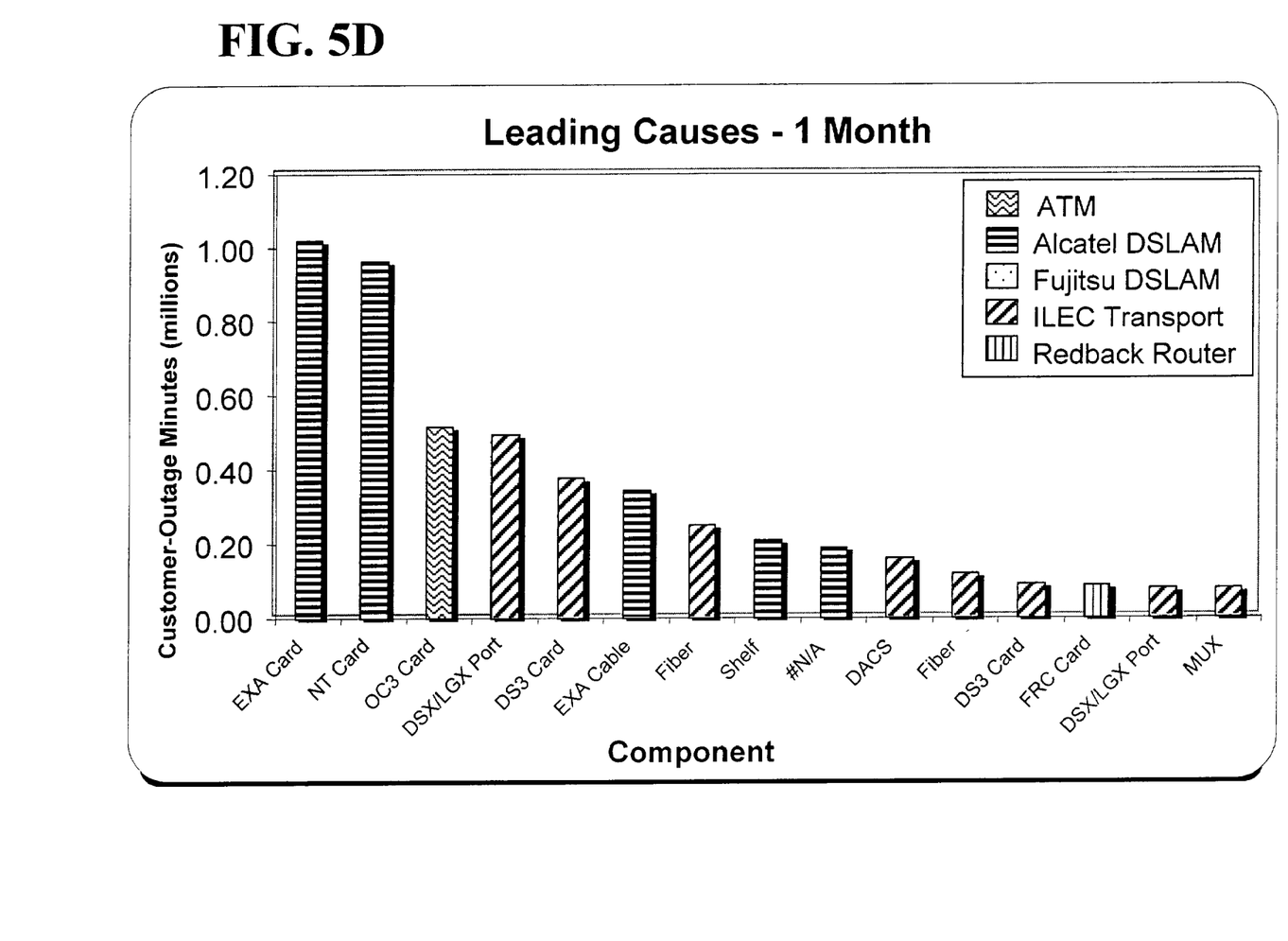
FIG. 5D is an exemplary Pareto chart, produced by one or more of the processes of FIG. 3, which identifies a diagnosis sequence for components within a variety of network device types, by number of customer-outage minutes that exceed a dynamically-generated threshold.
Figure 5E:
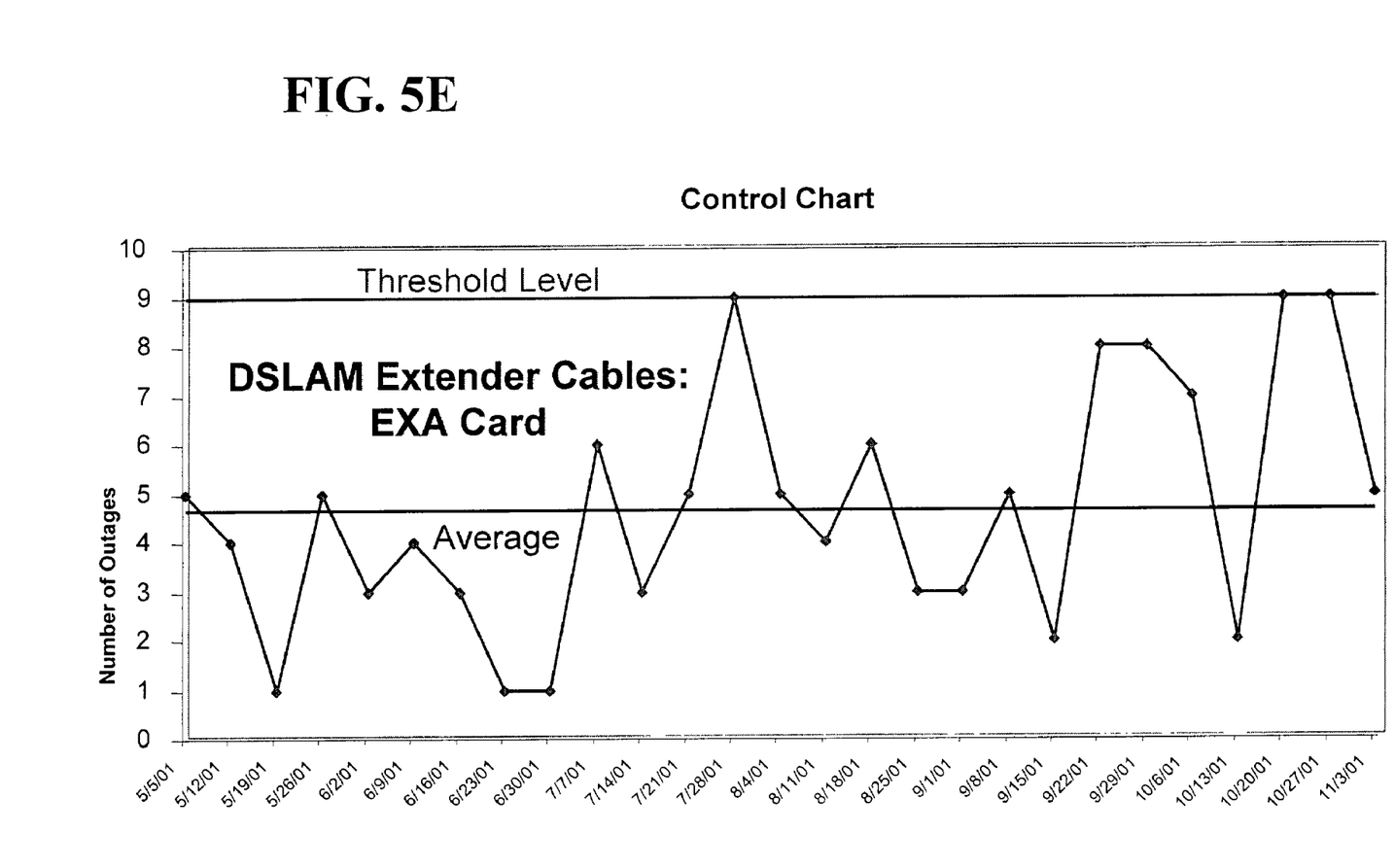
FIG. 5E is an exemplary control chart, produced by one or more of the processes of FIG. 3, which identifies an outage time trend of a component type within network device types, by number of customer-outage minutes that exceed a dynamically-generated threshold.

Similarly and with reference to FIGS. 5C-D, the network administrator can further identify components within one or more selected network devices that may be a likely cause of outage numbers, outage minutes, and/or customer-outage minutes that exceed the corresponding threshold. This data and/or information is useful with respect to focusing troubleshooting efforts in accordance with a diagnosis sequence, and in evaluating products offered by competing vendors (e.g., by comparing the customer-outage minutes of the Alcatel and Fujitsu DSLAM components). With reference to FIG. 5E, the outage number, outage minutes, and/or customer-outage minutes of a particular component can also be evaluated relative to a time interval to detect fault patterns with increasing component outages or time trends that are indicative of, for example, problematic hardware/software upgrades or other environmental changes.

Control charts or other representations displaying diagnosis sequences can be routed to one or more users via a routing process 318 (FIG. 3). In one embodiment, the routing process 318 can embed representations of the diagnosis sequences in an electronic mail ("email") message for subsequent routing to network troubleshooters that are, for example, responsible for maintaining the network devices identified in the diagnosis sequences. In another embodiment, the routing process 318 uploads the representations of the diagnosis sequences to one or more web or non-web accessible network locations so that network troubleshooters can access the sequences from any network-capable device. The routing process 318 can also send an email message to selected network troubleshooters so as to inform such troubleshooters that the diagnosis sequences have been posted to a particular network location.

Although the disclosed methods and systems have been described with reference to specific details, they are not intended as limitations upon the scope of the invention, except as and to the extent that they are included in the accompanying claims. For example, those skilled in the art will recognize that although the processes 310-318 are shown as distinct software processes, their functionality can be combined into a single process or into any combination of multiple processes. The processes 310-318 can also be provided using a combination of built-in functions of a spreadsheet program (e.g., Microsoft Excel) together with one or more custom-designed software modules (e.g., macros) to automate the interoperation of the built-in functions.

What is claimed is:

1. A method of identifying a source of fault patterns in a telecommunications network, method comprising:
   accessing historical and current fault data associated with operations of a plurality of network devices in the telecommunications network;
   identifying at least a subset of the fault data associated with an at least one filter criterion;
   dynamically generating a set of statistical metrics from the subset of fault data, the statistical metrics including at least one threshold; and
   prioritizing the subset of fault data relative to the threshold, the prioritized fault data identifying an ordered list of at least some of the network devices exhibiting operations exceeding the threshold.

2. The method of claim 1 wherein the threshold is based on at least one of a Poisson distribution and a Gaussian distribution.

3. The method of claim 1 wherein the historical fault data of the network devices corresponds to a prior time interval exceeding one month.

4. The method of claim 3 wherein the historical Fault data of the network devices corresponds to a prior time interval of about three months.

5. The method of claim 1 wherein the filter criterion corresponds to a type of network device.

6. The method of claim 5 wherein the ordered list identified by the prioritized fault data is based on at least one of a quantity of outages, a number of outage minutes, and a number of customer-outage minutes.

7. The method of claim 5 wherein the ordered list of network devices identifies a diagnosis sequence for such network devices.

8. The method of claim 1 wherein the filter criterion corresponds to locations within the telecommunications network.

9. The method of claim 8 wherein the ordered list identified by the prioritized fault data is based on at least one of a quantity of outages, a number of outage minutes, and a number of customer-outage minutes.

10. The method of claim 8 wherein the ordered list of network devices identifies a diagnosis sequence for the network locations.

11. The method of claim 1 further comprising:
    accessing a component list of particular components associated with the network devices identified in the ordered list; and
    determining an operational effect of the components in the component list contributing to the formation of the subset of fault data.

12. The method of claim 11 further comprising prioritizing the operational effects of the components in the component list based on at least one of a quantity of outages, a number of outage minutes, and a number of customer-outage minutes.

13. The method of claim 12 wherein the prioritized operational effects identify a diagnosis sequence for the components in the network devices identified in the ordered list.

14. The method of claim 1 wherein the ordered list identified by the prioritized fault data is based on at least one of a quantity of outages, a number of outage minutes, and a number of customer-outage minuets.

15. A system for identifying a source of fault patterns in a telecommunications network, the system comprising:

a data-acquisition process coupled to the telecommunications network, the data-acquisition process accessing historical and current fault data associated with operations of a plurality of network devices in the telecommunications network and identifying at least a subset of the fault data associated with an at least one filter criterion;

a statistics process dynamically generating a set of statistical metrics from the subset of fault data identified by the data-acquisition process, the statistical metrics including an at least one threshold; and a priority process coupled to the data-acquisition process and statistics process, the priority process prioritizing the subset of fault data relative to the threshold, the prioritized fault data identifying an ordered list of at least some of the network devices exhibiting operations exceeding the threshold.

16. The system of claim 15 wherein the historical fault data of the network devices corresponds to a prior time interval exceeding one month.

17. The system of claim 16 wherein the historical fault data of the network devices corresponds to a prior-time interval of about three months.

18. The system of claim 15 wherein the filter criterion corresponds to a type of network device.

19. The system of claim 18 wherein the ordered list identified by the prioritized fault data is based on at least one of a quantity of outages, a number of outage minutes, and a number of customer-outage minutes.

20. The system of claim 18 wherein the ordered list of network devices identifies a diagnosis sequence for such network devices.

21. The system of claim 15 wherein the filter criterion corresponds to locations within the telecommunications network.

22. The system of claim 21 wherein the ordered list identified by the prioritized fault data is based on at least one of a quantity of outages, a number of outage minutes, and a number of customer-outage minutes.

23. The system of claim 21 wherein the ordered list of network devices identifies a diagnosis sequence for the network locations.

24. The system of claim 15 wherein the data-acquisition process accesses a component list of particular components associated with the network devices identified in the ordered list, and wherein the priority process determines an operational effect of each of the components in the component list contributing to the formation of the subset of fault data.

25. The system of claim 24 wherein the priority process prioritizes the operational effects of the components in the component list based on at least one of a quantity of outages, a number of outage minutes, and a number of customer-outage minutes.

26. The system of claim 25 wherein the prioritized operational effects identify a diagnosis sequence for the components in the network devices identified in the ordered list.

27. The system of claim 15 wherein the ordered list identified by the prioritized fault data is based on at least one of a quantity of outages, a number of outage minutes, and a number of customer-outage minutes.

28. A method for identifying a source of fault patterns in a telecommunications network, the method comprising:

accessing historical and current fault data associated with operations of a plurality of network devices in the telecommunications network;

identifying at least a subset of the fault data associated with at least one filter criterion, said at least one filter criterion relating to at least one of device type, network location, component type, time, and event type;

dynamically generating a set of statistical metrics from the subset of fault data, the statistical metrics including at least one threshold;

prioritizing the subset of fault data relative to the threshold, the prioritized fault data identifying an ordered list of at least some of the network devices exhibiting operations exceeding the threshold; and determining from the ordered list a set of problem-prone network components, whereby the source of fault patterns in the network is identified.

* * * * *